J. G. HEASLET.
DIFFERENTIAL GEARING.
APPLICATION FILED JULY 27, 1910.

1,006,847.

Patented Oct. 24, 1911.

UNITED STATES PATENT OFFICE.

JAMES G. HEASLET, OF DETROIT, MICHIGAN, ASSIGNOR OF ONE-HALF TO WALTER E. FLANDERS, OF PONTIAC, MICHIGAN.

DIFFERENTIAL GEARING.

1,006,847.  Specification of Letters Patent.  Patented Oct. 24, 1911.

Application filed July 27, 1910. Serial No. 574,129.

*To all whom it may concern:*

Be it known that I, JAMES G. HEASLET, a citizen of the United States, resident of Detroit, county of Wayne, and State of Michigan, have invented a new and useful Improvement in Differential Gearing for Automobiles, of which the following is a specification, the principle of the invention being herein explained and the best mode in which I have contemplated applying that principle, so as to distinguish it from other inventions.

My invention has reference to a differential gear for automobiles, and particularly to the housing connections therefor, which, while combining lightness with durability, shall permit of being more readily assembled and disassembled, than has been, so far as I am aware, heretofore possible.

It is, then, the fulfilment of these two purposes which this invention has for an express object, and toward the accomplishment of which it consists of means hereinafter fully described and particularly set forth in the claims.

The annexed drawings and the following description set forth in detail certain mechanism embodying my invention, the disclosed means, however, constituting but one of various mechanical forms in which the principle of the invention may be applied.

Figure 1:
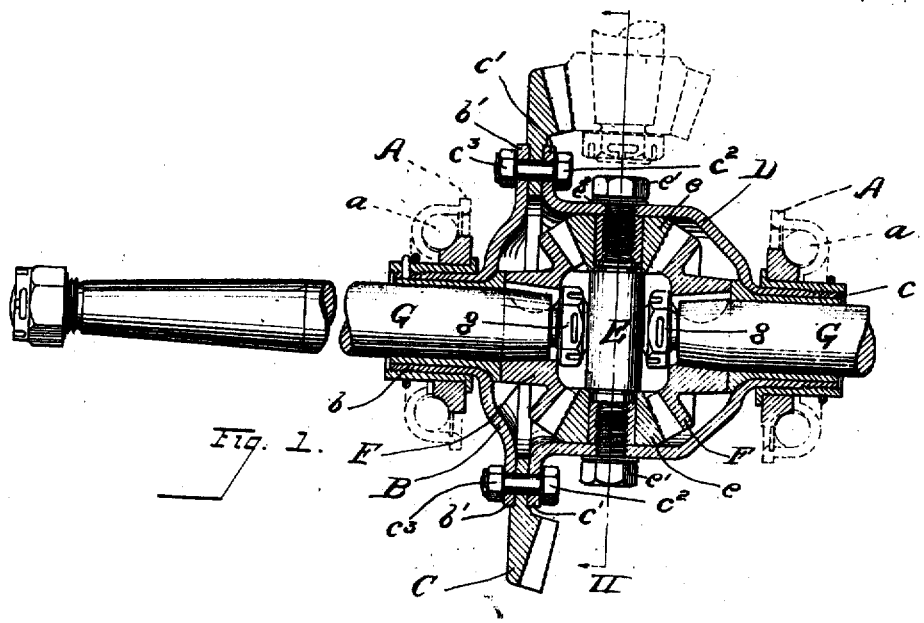
Figure 2:
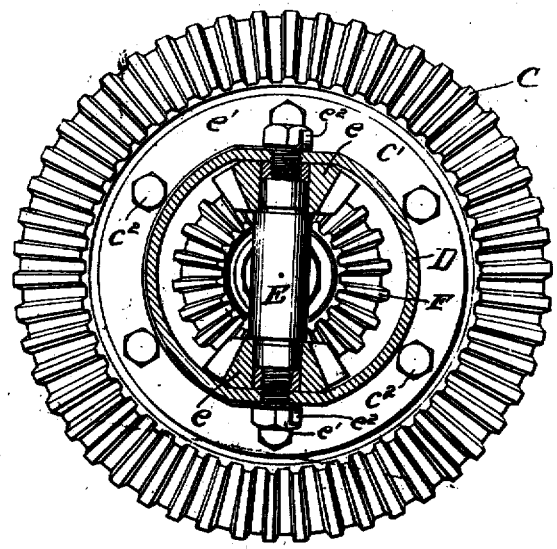

In said annexed drawings:—Figure 1 is a horizontal section of a differential gearing embodying my invention. Fig. 2 is a vertical section on line II—II of Fig. 1, looking in the direction of the arrows.

Referring to the drawings in which like letters of reference refer to like parts in both the views, it will be noted that the structure in its entirety is supported in the usual manner from the frame A, shown in dotted lines, and more specifically upon the ball bearings $a$, also shown in dotted lines. The structure comprises a casing member B provided with a laterally projecting annular flange $b$, which is associated with the bearings $a$ in the usual manner. This member is also provided with a longitudinally projecting annular flange $b'$.

A primary driving gear C, which is driven by means of the usual driving pinion, shown in dotted lines, is adapted to rest against the annular flange $b'$. A complementary housing member D is similarly provided with a laterally projecting annular flange $c$, and a longitudinally projecting flange $c'$. The latter is adapted to abut, in turn, the opposite sides of the primary gear C, whereby the latter may be detachably secured between the flanges $b'$ and $c'$, in any approved manner as with the bolts $c^2$ and nuts $c^3$. A stud E, having mounted upon it the two oppositely disposed idlers $e$, is connected to the housing member D by means of cap-screws $e'$. These are, then, locked in the usual or any approved manner, as shown at $e^2$. The idlers are, of course, in mesh, with two secondary driving gears F, which are keyed to the ends of the two axles G, as indicated. They are held against displacement by the nuts $g$. The latter abut the stud E, as clearly appears in Fig. 1.

As will now be apparent to those skilled in the art, the driving pinion operates to effect the rotation of the primary driving gear, which, in turn, rotates the housing member D, to revolve the idlers $e$, which finally rotate the secondary driving gears F, and so necessarily the axles. My invention is especially designed to facilitate the assemblage or disassemblage of the inclosing parts, whereby the interior gear construction can be readily inspected or adjusted as the exigencies of the case may require. This may be accomplished through the readily accessible agency of the nuts $c^3$ and cap-screws $e'$.

Having fully described my invention, what I claim and desire to secure by Letters Patent is:—

1. In a differential gearing the combination of a housing member, a primary driving gear, a casing member, means for detachably securing said driving member between said housing and casing members, a stud carried wholly by said housing member, said stud being of a length equal to the diameter of said housing member, idlers mounted on said stud, axles extending into said housing member and abutting said stud, secondary driving gears upon said axle and in mesh with said idlers, and detachable means for securing said stud to said housing member.

2. In a differential gearing the combination of a housing member provided with an annular flange, a primary driving gear, a complemental casing member provided with an annular flange, means for detachably securing said primary gear to said flanges, a stud carried wholly by said housing member and of a length equal to the diameter thereof, idlers carried by said stud, axles extending into said housing member, secondary driving gears carried by said axles and in mesh with said idlers and cap screws extending through said housing member into the opposite ends of said stud.

Signed by me, this 26th day of July, 1910.

JAMES G. HEASLET.

Attested by—
    JAMES E. SPENCER,
    FRANK A. BATES.